United States Patent
van Zanten et al.

(10) Patent No.: US 10,059,321 B2
(45) Date of Patent: Aug. 28, 2018

(54) DIAGNOSTIC METHOD FOR A BRAKING SYSTEM

(71) Applicant: IPGATE AG, Pfäffikon (CH)

(72) Inventors: Anton van Zanten, Ditzingen (DE); Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 192 days.

(21) Appl. No.: 15/133,459

(22) Filed: Apr. 20, 2016

(65) Prior Publication Data

US 2016/0311422 A1    Oct. 27, 2016

(30) Foreign Application Priority Data

Apr. 21, 2015    (DE) .................. 10 2015 106 089

(51) Int. Cl.
| | |
|---|---|
| *B60T 17/22* | (2006.01) |
| *B60T 13/66* | (2006.01) |
| *B60T 8/40* | (2006.01) |
| *B60T 8/92* | (2006.01) |
| *B60T 8/88* | (2006.01) |
| *G01M 3/28* | (2006.01) |

(52) U.S. Cl.
CPC .......... *B60T 17/221* (2013.01); *B60T 8/4081* (2013.01); *B60T 8/885* (2013.01); *B60T 8/92* (2013.01); *B60T 13/662* (2013.01); *G01M 3/2869* (2013.01); *B60T 2270/403* (2013.01)

(58) Field of Classification Search
None
See application file for complete search history.

(56) References Cited

U.S. PATENT DOCUMENTS

| | | | | |
|---|---|---|---|---|
| 5,221,125 | A * | 6/1993 | Okochi ................. | B60T 8/3615 188/151 A |
| 6,161,904 | A * | 12/2000 | Schmidt ................. | B60T 7/042 303/122.04 |
| 6,183,050 | B1 * | 2/2001 | Ganzel ................... | B60T 7/042 188/358 |
| 8,550,571 | B2 * | 10/2013 | Yamamoto ........... | B60T 8/4081 303/11 |

(Continued)

FOREIGN PATENT DOCUMENTS

| | | |
|---|---|---|
| DE | 19807369 A1 | 8/1999 |
| DE | 10249881 A1 | 6/2003 |

(Continued)

OTHER PUBLICATIONS

Search Report (German language) dated Jan. 7, 2016 in DE Application No. 102015106089.2.

*Primary Examiner* — Paul West
*Assistant Examiner* — Mark A Shabman
(74) *Attorney, Agent, or Firm* — Panitch Schwarze Belissario & Nadel LLP

(57) ABSTRACT

A diagnostic method may determine the leak-tightness of at least one seal and/or one valve function in a braking system with at least two brake circuits, following completion of a braking action. The diagnostic method may be carried out at a pressure still present after the braking action in one or both braking circuits and/or in hydraulic line or a working chamber of a piston-cylinder system or at a lower pressure, or it may be carried out at a pressure of at most 30 bar.

21 Claims, 5 Drawing Sheets

(56) References Cited

U.S. PATENT DOCUMENTS

| | | | | |
|---|---|---|---|---|
| 2003/0090149 | A1* | 5/2003 | Kusano | B60T 8/34 303/191 |
| 2007/0108837 | A1* | 5/2007 | Ohkubo | B60T 8/4081 303/122.08 |
| 2007/0114844 | A1* | 5/2007 | Maki | B60T 8/3655 303/122.09 |
| 2013/0127240 | A1* | 5/2013 | Noro | B60T 13/58 303/14 |
| 2016/0046272 | A1 | 2/2016 | Masur et al. | |

FOREIGN PATENT DOCUMENTS

| | | |
|---|---|---|
| DE | 112009002349 T5 | 7/2011 |
| DE | 102011080312 A1 | 2/2012 |
| DE | 102014205431 A1 | 10/2014 |
| DE | 102014111594 A1 | 2/2016 |
| EP | 1795416 A1 | 6/2007 |
| WO | 2012017037 A2 | 2/2012 |
| WO | 2016023995 A1 | 2/2016 |

* cited by examiner

DIAGNOSTIC METHOD FOR A BRAKING SYSTEM

CROSS-REFERENCE TO RELATED APPLICATIONS

This application claims priority to German Patent Application No. 10 2015 106 089.2, filed on Apr. 21, 2015, the disclosures of which are incorporated herein by reference.

PRIOR ART

In safety-relevant systems, a diagnostic cycle is often introduced in order to allow failures, also incipient failures, for example leaking seals, to be detected. This is referred to as a Pre-Drive Check or PDC.

Additional components involving additional cost, for example in DE 10 2011 080 312 a solenoid valve, are also used in order to check pistons and seals.

A major disadvantage of the PDC is the additional loading on the seal and the generation of pressure with corresponding load cycles, which may represent a doubling of said load cycles. In a braking system one can expect approx. 200,000 actuations per year (equivalent to 250 hours actuation time) with different brake pressures, in over 80% of cases below 25 bar and only in a few cases in a thousand above 100 bar.

A diagnostic cycle is of great importance in terms of the probability of failure POF. If, for example, the function were to be checked during or following each braking action, then the failure rate would only be $(1/200,000=5\cdot10^{-6})\times$the yearly value recorded statistically in ppm=$10^{-6}$, for example, for a seal with a yearly value of 1 ppm: $5\cdot10^{-6}\times 1\cdot10^{-6}=5\cdot10^{-12}$ per year, an extremely low POF. By way of comparison, the figure for a brake circuit failure is 10 ppm/year.

Many systems also feature a built-in check, in which the functions are continually checked for plausibility; for example in a braking system with measurement of the main cylinder piston stroke the corresponding volume is compared with the braking pressure and the pressure/volume curve PV and any leak is thus detected.

Object of the Invention

The object of the invention is to provide a diagnostic method which only places a small load on the components of the braking system.

Solution of the Problem

This problem is solved according to the invention by means of a diagnostic method with the features of claim 1. Advantageous embodiments of the diagnostic method according to claim 1 are specified in the dependent claims.

The diagnostic method according to the invention is characterised, advantageously, in that the individual diagnostic tests, which in this diagnostic method can be carried out individually or in combination, are only carried out at low pressures, as a result of which the components of the braking system are not subjected to stresses in addition to the loads which occur during braking actions. The diagnostic method according to the invention is advantageously carried out at the end of a braking action, when only a comparatively low pressure prevails in the brake circuits and individual components of the braking system. This low pressure is sufficient for the diagnostic method according to the invention.

The diagnostic method according to the invention with its individual diagnostic tests can be used in different braking systems.

Advantageously, a diagnostic cycle is performed after the following braking manoeuvres in which the vehicle is braked to a halt:

BED—at the end of braking (driver releases the brake pedal)

CSD—when the vehicle is brought to a halt with the brake actuated after the vehicle has come to a halt PSD—when the vehicle is brought to a halt and parked with the brake subsequently being released At the end of these braking manoeuvres BED, CSD and PSD, the pressure already attained in the braking system is, for example in the case of CSD, 10-20 bar. This pressure is quite sufficient for the diagnostic tests A to D described in the following.

In the case of BED, at the end of braking, shortly before the end of the pedal actuation, a low braking pressure of for example 5 bar is maintained over a short duration of approx. 0.2 seconds through corresponding solenoid valve actuation and the leak-tightness or solenoid valve functions are hereby checked. This would achieve the aforementioned significant reduction in the probability of failure. The problem here is the delayed reduction in pressure Pab.

In the case of CSD for example, a diagnostic cycle would, statistically, take place every 6 minutes of braking operation (i.e. 10 times per hour of braking operation). This is based on the assumption that a driver brakes until the vehicle comes to a halt, then maintains the braking pressure for a few seconds longer. With 200 hours per year of brake operation this would mean 2000 CSD tests per year, and would result in a reduction of the probability of failure POF by the factor $1/2000=5\cdot10^{-4}$ or, taking the example of the seal, $(1\cdot10^{-6})\cdot(5\cdot10^{-4})=5\cdot10^{-10}$ per year. Here too, a significant reduction in the probability of failure is achieved which corresponds to the failure of both brake circuits according to the present state of the art.

In the case of PSD (according to statistics after approx. 1 hour driving time), on being parked the vehicle remains stationary for a longer period, allowing unlimited time for more extensive tests. Here too, as in the case of CSD, the braking pressure is first used for the purpose of diagnosis and, for example every 10 hours of braking operation, a higher pressure is used for different functions, also where previous diagnoses have suggested a possibility of failure. This would lead to a reduction in the probability of failure POF of $10/200=5\cdot10^{-2}$ or in the case of the seal $\approx 5\cdot10^{-8}$/year, in any case lower by a factor of 20 than without PSD. The number of load cycles at 100 bar would in this case increase by a factor of 5. The failure mechanisms must be considered here.

A seal becomes worn with the number of load cycles and pressure-loading. Normally, a small leakage occurs over a longer number of cycles until wear takes place, then the rate of leakage increases sharply. This applies to normal piston or rod seals.

In the case of gaskets with top-up bore, this rapid increase can occur following damage to the sealing lip. The leak increases with the pressure, the function depends on the nature of the flow.

In the case of ball valves, the leak is caused by particles of dirt being washed into the valve seat, the maximum particle size being determined by the mesh width of the filters. A leak detected at lower pressures becomes less at higher pressures due to the greater sealing force of the balls.

The above facts show that a diagnosis at low pressures is sufficient in the case of braking systems.

These diagnostic cycles are described with reference to the system illustrated in FIG. 1, but can also be applied to systems according to DE 10 2011 080 312 or DE 10 2014 205 431. These diagnostic cycles are of great importance where no redundancy of subsystems or components is possible, for example in the case of braking systems with main cylinder and wheel cylinders. In this case, in contrast to sensors, motors etc., redundancy can only be realised with difficulty.

The diagnostic method according to the invention together with its diagnostic tests is explained in the following with references to figures, in which.

Figure 1:
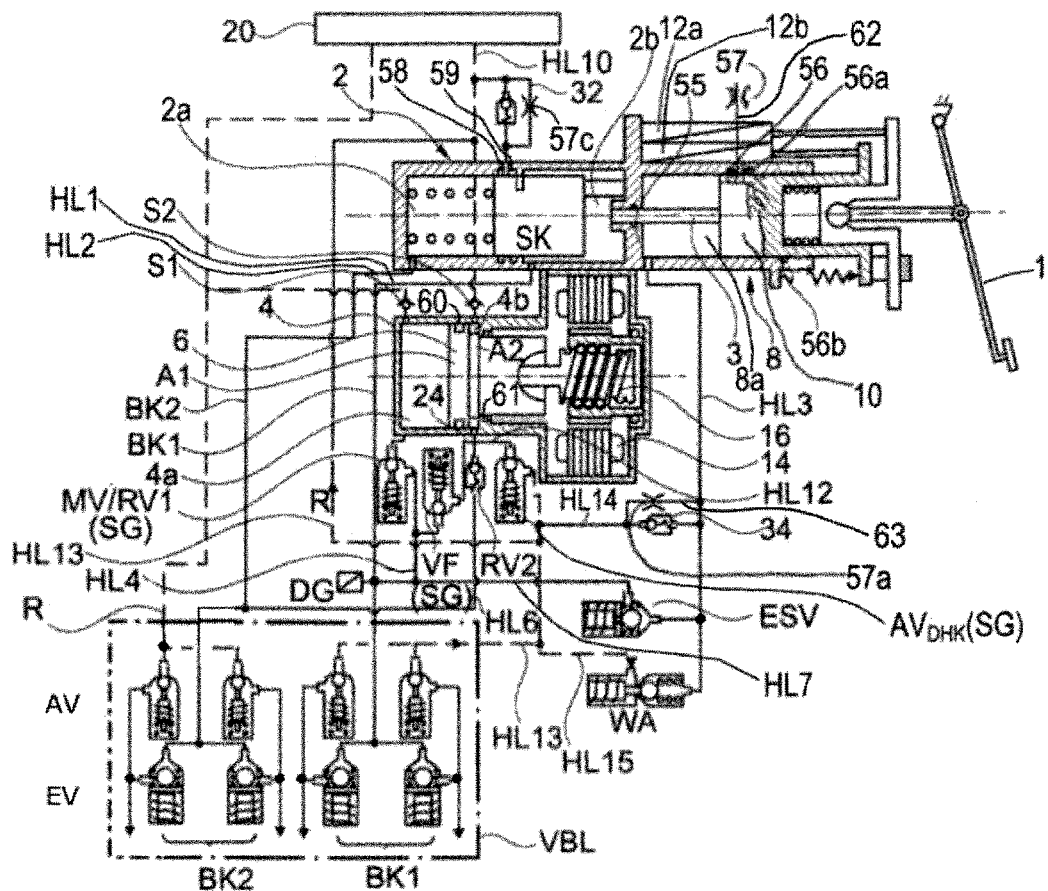
FIG. 1 shows a possible braking system in which the diagnostic method according to the invention can be used.
Figure 3:
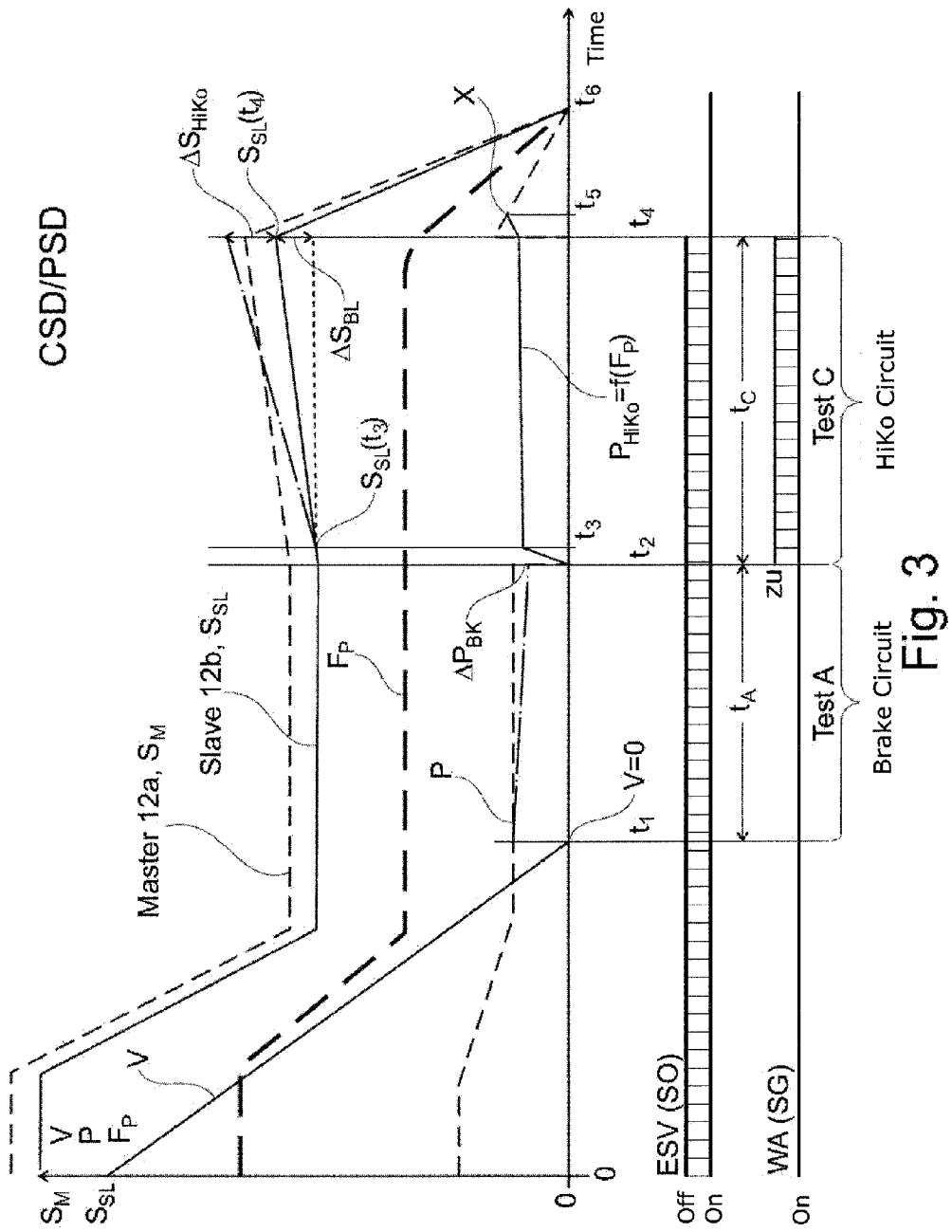
FIG. 3 shows a CSD/PSD braking manoeuvre with subsequent diagnosis of the brake circuits and of the auxiliary piston circuit with analysis of the pressure and pedal travel curve.

FIG. 1 shows a brake actuation system which largely corresponds to that shown in FIG. 3 in DE 10 2014 111 594, so that in this connection reference is also made to this. A first pressure source, in the form of a piston-cylinder unit (main cylinder) 2, a second pressure source or piston-cylinder unit 4 with double-acting piston (DHK) 6 and a third pressure source or piston-cylinder unit 8 with auxiliary piston 10 are provided. An actuation device, in particular a brake pedal 1, acts on the auxiliary piston 10 via a force-displacement sensor KWS (described in more detail in the following) with two pedal travel sensors 12a, 12b. The movement of the auxiliary piston can be transmitted to the piston SK of the first piston-cylinder unit (main cylinder) 2 by means of an auxiliary piston rod 3. The double-acting piston (DHK) 6 of the second piston-cylinder unit is driven by means of an electromechanical drive with motor 14 and ball screw gear KGT 16. The front end of the floating piston SK limits a working chamber 2a, which is connected with a hydraulic line HL6 via a hydraulic line HL2. The hydraulic line HL6 is part of the brake circuit BK2 and is connected with the inlet valves EV associated with the wheel brakes. The inlet valves EV can, practically, be arranged in a valve assembly or a valve block VBL.

A further hydraulic line HL1 is part of a further brake circuit BK1 and connects a working chamber 2b formed on the rear side of the floating piston SK with the inlet valves EV of the brake circuit BK1. The double-acting piston (DHK) 6 of the second piston-cylinder unit 4 forms two separate working chambers 4a or 4b, whereby the piston has different-sized active surfaces A1 and A1-A2 and whereby the working chambers are connected via hydraulic lines HL4/HL6 with the hydraulic lines HL1/HL2. The piston stage with the large active piston surface is provided with a first seal 60 which separates the working chambers 4a and 4b hydraulically from one another, while the piston stage with the small active piston surface is provided with a second seal 61 which separates the working chamber 4b hydraulically from the outside. Further hydraulic lines, in which check valves S1 or S2 are installed, lead from the working chambers 4a, 4b of the double-acting piston to the reservoir 20. The check valves act as suction valves during the forward stroke (S2) and during the return stroke (S1) of the double-acting piston. A necessary electronic control and regulation unit (ECU) for the motor and the other electrical components are not shown here.

A check valve RV1 which, advantageously, in particular together with a solenoid valve, forms a combined check/solenoid valve MV/RV1 which is normally closed, is arranged in the hydraulic line HL4 starting out from the front (on the left in the Figure) working chamber 4a of the double-acting piston. This solenoid valve allows a pressure reduction on the return stroke of the double-acting piston. Starting out from the solenoid valve MV/RV1, a hydraulic line 24 forms a connection between the working chambers 4a, 4b of the double-acting piston, in which a normally-closed solenoid valve VF is installed. The connecting line hereby opens into the corresponding hydraulic lines (viewed from the direction of the working chambers) after the solenoid valve MV/RV1 and before a check valve RV2, which (not shown) can also be combined with a solenoid valve. Starting out from the line HL4 a further hydraulic line HL7 leads to a solenoid valve ESV and from this via the line HL3 to the working chamber 8a of the auxiliary piston-cylinder arrangement 8.

A further throttle check valve arrangement 32 is provided in a hydraulic line HL 10 leading from the working chamber 2a of the piston SK of the piston-cylinder arrangement (main cylinder) to the reservoir 20. This is intended for pressure equalisation when the vehicle is parked. In the event of a reduction in temperature the check valve causes equalisation of the pressure in that the volume reduction is compensated and in the event of a volume increase the throttle causes the outflow into the reservoir and replaces a normally-open solenoid valve, as in the applicant's DE 10 2014 111 594, to which reference is made in this connection.

The hydraulic line HL10 is separated from the working chamber 2a of the piston SK of the piston-cylinder arrangement (main cylinder) through a first floating piston seal 58, and from the working chamber 2b of the piston SK of the piston-cylinder arrangement (main cylinder) through a second floating piston seal 59.

An additional solenoid valve $AV_{DHK}$ is connected via a hydraulic line HL12 to the rear (on the right in the Figure) working chamber 4b of the double-acting piston, which has a smaller active surface A1-A2. The hydraulic line HL12 hereby opens into the hydraulic line HL6 between the working chamber 4b and the check valve RV2. A further hydraulic line HL13 leads from the solenoid valve $AV_{DHK}$ to the return line of the outlet valves AV of a brake circuit BK1. A hydraulic line HL14 also branches off from this hydraulic line HL13, leading via a throttle check valve arrangement 34 to the line HL3 or to the working chamber 8a of the auxiliary piston-cylinder arrangement. The function of the throttle 57a in the throttle check valve arrangement 34 is comparable with the function of the throttle 57c in the throttle check valve arrangement 32. A further hydraulic line HL15 branches off from the line HL13 and leads via an intervening solenoid valve WA to the line HL3 or to the working chamber 8a of the auxiliary piston 10. When the solenoid valve WA is open, the travel simulator function is active. In order to limit the pedal travel, the solenoid valve WA is closed as soon as the travel simulator is adjusted. Also, in order to limit the pedal travel, the solenoid valve WA is closed during functioning of the ABS as soon as a pressure reduction commences. Thus, as at present in the case of the recirculation pump (return pump) of the ABS, the pedal is locked as soon as the pressure reduction commences.

Through opening of the solenoid valve ESV, with the solenoid valve WA closed, volume can also be transferred from the double-acting piston 6 into the working chamber 8a of the auxiliary piston 10 and a pedal movement generated in order to warn the driver.

In special cases, for example in the event of a μ-jump from high to low μ in the roadway, the auxiliary piston 10 can also be moved back by means of the aforementioned control unit in order to create more piston travel and therefore volume for the fallback option if the motor cuts out after the μ-jump and the volume or the pressure has to be generated by the driver's foot. In this case this measure can increase the remaining volume by up to 40%, so that sufficient braking pressure is generated.

In order to build up pressure during the forward stroke of the double-acting piston (DHK) 6, with the solenoid valve VF closed volume is transported into the brake circuit BK1 via the large effective piston area A1. At the same time, volume is transported into the brake circuit BK2 via the brake circuit BK1 and the floating piston SK. On the return stroke of the double-acting piston (DHK) 6, volume is transported into the brake circuit BK2 via the small effective piston area A1-A2; at the same time volume is transported into the brake circuit BK1 via the brake circuit BK2 and the floating piston SK. With the solenoid valve VF open, the volume is transported during the forward stroke via the small effective piston area A1−(A1−A2)=A2. On the return stroke of the double-acting piston and with the solenoid valve VF closed, the volume is transported into the brake circuit BK2 via the small effective piston area (A1-A2). A pressure equalisation between the brake circuits BK1, BK2 takes place with the solenoid valve VF open when the pressure in the brake circuit BK2 is greater than in the brake circuit BK1, or on the return stroke, when the pressure in the brake circuit BK2 is greater than that in the brake circuit BK1. A positioning of the double-acting piston 6 can be effected through actuation of the solenoid valve devices VF, MV/RV1 and $AV_{DHK}$. The positioning can hereby be effected from the forward stroke (via MV/RV1, VF, $AV_{DHK}$) or the return stroke (via $AV_{DHK}$) of the double-acting piston 6.

If both the solenoid valve VF and also the solenoid valve MV/RV1 and the solenoid valve $AV_{DHK}$ are open and all inlet valves EV are closed, a positioning of the double-acting piston 6 can be effected with the return stroke and forward stroke, which is advantageous for the subsequent pressure build-up $P_{auf}$ or pressure reduction $P_{ab}$ and for multiplex mode (MUX), since the transfer of volume is possible with the subsequent forward stroke or return stroke.

The pressure reduction $P_{ab}$ on completion of a braking action can be effected via of one or more outlet valves AV. The pressure reduction from the brake circuit BK2 takes place directly via outlet valve AV into the reservoir 20 and from the brake circuit BK1 via solenoid valve VF and check valve RV2 into the brake circuit BK2 and accordingly via outlet and inlet valves AV and EV. Both brake circuits BK1, BK2 are hereby connected, so that pressure can also be reduced from the brake circuit BK1 through the pressure equalisation without an outlet valve AV from brake circuit BK1 being opened. Alternatively, the pressure reduction can be effected via the return stroke of the double-acting piston (DHK) 6 with the solenoid valves MV/RV1 and $AV_{DHK}$ open, which results in a particularly low-noise and precise pressure control, since the dynamics of the double-acting piston 6 can be controlled and no switching noises are produced by the outlet valves AV if the pressure is reduced in stages.

With the additional solenoid valve $AV_{DHK}$, which on the return stroke of the double-acting piston connects the rear pressure chamber of the double-acting piston with the reservoir 20, the large active surface A1 of the piston is active, so that, due to the large volume, the full pressure can be released via the return stroke, also from a high pressure range. This has the advantage that the brake circuits do not need to be opened via the outlet valves AV of the wheel brakes and an additional diagnosis of the leak-tightness of these outlet valves AV is not necessary. This valve actuation is also advantageous in multiplex mode (MUX).

As a result of the large transfer or intake of volume of the brake circuits for high pressures, for example in the case of fading, more volume can be present in the brake circuit than the volume for pressure reduction in the double-acting piston 6 makes possible. During pressure reduction, the surplus volume must be transferred via one or more outlet valve AV into the reservoir 20. The pressure reduction can then be effected via the aforementioned solenoid valve switching and the double-acting piston 6. Alternatively, the double-acting piston 6 can be repositioned as described through a forward stroke with closed inlet valves EV. In MUX mode, pressure must also be reduced via outlet valves AV in order, for example in the event of a negative μ-jump, to be returned to the working range of the double-acting piston for pressure build-up and pressure reduction.

For some special functions such as brake assistant, brake circuit failure or "blending" during recuperation it is advantageous for the pedal characteristic to be made variable, in that for example the inlet valves EV are closed and the solenoid valves ESV and WA are opened. This allows the pedal travel to be changed with additional control of the pedal force through pulse width modulation (PWM) operation of the solenoid valve WA or/and ESV and force control via the force-displacement sensor KWS, whereby the differential movement signal of the two pedal travel sensors 12a, 12b is, as from a defined preload force of the KWS spring, proportional to the force on the KWS spring. A corresponding pedal force and a corresponding pedal travel can also be generated with the double-acting piston and the pressure transducer DG through corresponding solenoid valve switching (WA closed, MV/RV1 open).

In order to adjust the normally pressure-proportional pedal reaction, this pedal reaction can be temporarily deactivated through closure of the inlet valves EV and opening of the solenoid valve ESV, so that, through pulse width modulation of the solenoid valves ESV or WA or both, the dynamic pressure in the—working chamber 8a of the auxiliary piston and in the working chamber 2b of the first pressure source [and] the pedal reaction determined by the force-displacement sensor KWS can be controlled. Alternatively, the inlet valves EV can be closed and the solenoid valve ESV opened and, by means of pulse width modulation of the solenoid valve WA, the double-acting piston (DHK) 6 determines, through forward stroke or return stroke, the dynamic pressure measured by the pressure transducer DG; the dynamic pressure in turn determines the pedal reaction.

The failure-safety of the auxiliary piston circuit, in particular the seals of the auxiliary pistons 56 and 56a, is of great importance, as is that of the solenoid valve WA and of the check valves of the throttle check valve arrangement 34. If there is a leak, in the fallback condition in the event of failure of the motor the brake circuit BK1 also fails. The seal 55 of the auxiliary piston is non-critical in this case, since in the fallback condition the auxiliary piston circuit is also the brake circuit BK1. In normal operation, a pronounced leak in the seal 55 affects the pedal force as a result of the dynamic pressure before the open solenoid valve WA. This can be avoided through a long guide of the auxiliary piston rod 3 with a close fit, a so-called rod seal. For the purpose of failure-safety, a second seal 56a is used in the auxiliary piston. A leak flow channel 62 with a throttle 57 is provided between the two seals. If the seal 56 is leaking, then the leakage flow is limited by the throttle; a leak in the seal 56 can be detected through definition of the leakage flow in a special diagnostic cycle in which the pressure loss caused by a leak is measured at a particular low pressure in the pressure chamber 8a of the auxiliary piston 10.

This leak flow channel 62 can also be designed without a throttle with a top-up bore in the piston 10. Alternatively to the use of two seals, only one seal 56b without leak flow channel 62 can also be used (see lower half of the auxiliary piston 10) and a top-up channel 63 with throttle 57a parallel to the check valve 34. A system with simplified valve arrangement is described in DE 10 2014 111 594.5, FIG. 1.

A system according to DE 10 2011 080 312 can also be tested with for example CSD and PSD.

During a braking action, the solenoid valve WA (see FIG. 1) is open. Leakage in this solenoid valve does not therefore affect the normal braking operation and cannot therefore be detected from the behaviour of the system during the braking action. Nor, since with the solenoid valve WA open the auxiliary piston circuit is virtually pressure-free, do leaks in the seal 56 and in the check valve of the throttle check valve arrangement 34 affect the behaviour of the system. For the fallback condition, for example in the event of motor failure, the leak-tightness of these valves and the seal 56 is of great importance in order to have sufficient volume available for high braking pressures.

During ABS operation, in order to modulate the pressure in the wheel cylinders, volume is repeatedly transferred from the brake circuits BK1 and BK2 to the reservoir through opening of the outlet valves AV. In this case any additional loss in volume through leakages in the seals 58 and 59 of the floating piston, in the seal 55 and in the solenoid valve ESV is not noticeable. Here too it is the case that for the fallback condition, for example in the event of motor failure, the leak-tightness of these seals 58 and 59 of the floating piston is of great importance in order to have sufficient volume available in the brake circuits BK1 and BK2 for high braking pressures.

Figure 2:
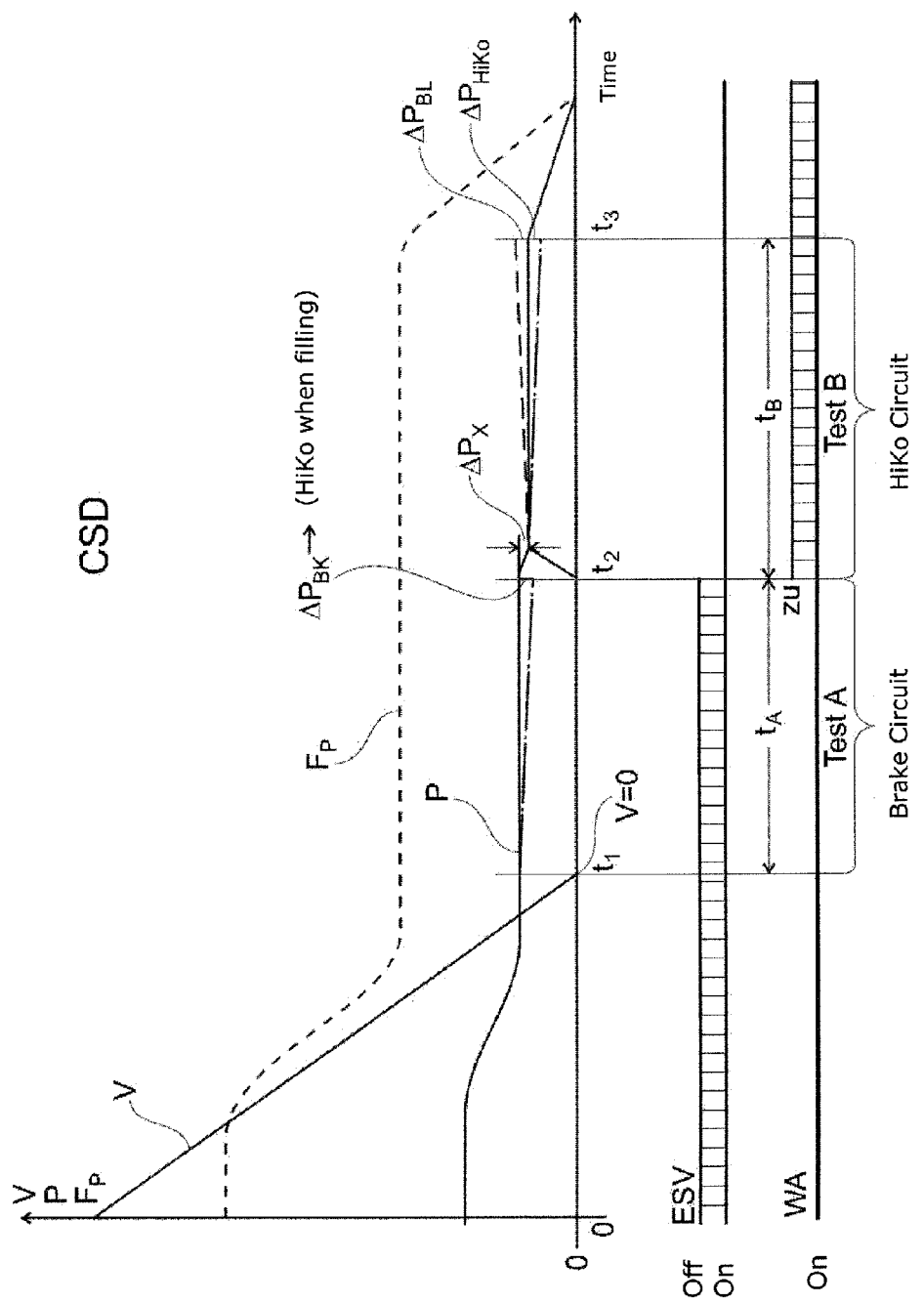
FIG. 2 shows a CSD braking manoeuvre with subsequent diagnosis of the brake circuit and of the auxiliary piston circuit with analysis of the pressure curve.

The diagnostic cycle CSD can also be used to test for such leakages and leaks. FIG. 2 shows the sequence of the diagnostic cycle CSD. This test allows the leak-tightness of the brake circuits BK1 and BK2 to be checked. It is also possible to test the auxiliary piston circuit. The test is only carried out when the vehicle is stationary, so that changes in the braking pressure in the circuits BK1 and BK2 which are caused through the diagnosis are not manifested in a deceleration of the vehicle.

FIG. 2 shows the time sequence at the end of a braking action, with the time taken for the vehicle to come to a standstill from a vehicle speed V, which is reduced to 0 m/s through the braking action, shown on the X-axis. The pressure in the wheel cylinders, as measured by the pressure transducer DG, is shown as a continuous curve P. Until the vehicle comes to a standstill the pressure in the wheel cylinders P is adjusted by the system according to the pedal travel sensor signal Master and produces the pedal force $F_p$. During this adjustment it is ensured that at low vehicle speeds, for example less than 10 km/h, the pressure P is not reduced below a certain level (for example 5 bar), which is necessary for the diagnostic cycle. After the vehicle has come to a halt at the time $t_1$ the brake pedal normally remains actuated for a short period of time, so that the diagnostic cycle can be carried out during this time. During the diagnostic cycle the pressure regulation is interrupted. The solenoid valves MV/RV1, VF and $AV_{DHK}$ are also not actuated during the diagnostic cycle, so that these are closed.

During the time interval $t_A$ the test A takes place and the brake circuits BK1 and BK2 are tested for leaks. The solenoid valve ESV thereby remains closed and the solenoid valve WA remains open. If, with the pedal travel sensor signal Master $s_M$ remaining constant, the pressure sensor signal of the pressure transducer DG remains constant at the value $p_{t1}$ at the beginning of the test, then both circuits BK1 and BK2 are leak-tight and intact and at the end of test A the pressure sensor signal $p_{t2}$ of the pressure transducer DG is equal to the pressure sensor signal $p_{t1}$ of the pressure transducer DG. This means that the seals 58 and 59 of the floating piston SK, the seal at the auxiliary piston rod 55 and the solenoid valve ESV are leak-tight. All the outlet valves AV are in this case also leak-tight. However, if the pressure sensor signal of the pressure transducer DG falls during test A, as indicated through the broken-dotted curve, then at the end of test A the pressure sensor signal $p_{t2}$ of the pressure transducer DG is less by the amount $\Delta p_{BK}$ than the pressure sensor signal of the pressure transducer DG at the beginning of test A, $p_{t1}$, and a leak exists in brake circuit BK1 and/or in brake circuit BK2.

Following successful completion of test A on the brake circuits BK1 and BK2, the test B of the auxiliary piston circuit takes place during the time interval $t_B$. The solenoid valve WA is thereby closed and the solenoid valve ESV open. As a result of this solenoid valve actuation, the pressure in the auxiliary piston circuit is increased. The pressure in the brake circuit BK1 is reduced through this solenoid valve actuation by a very small amount, $\Delta p_x$, since the auxiliary piston circuit displays a slight elasticity, and volume is displaced from the brake circuit BK1 via the hydraulic lines HL7 and HL3 into the working chamber 8a of the auxiliary piston 10. Now the pressure sensor signal of the pressure sensor DG in brake circuit BK1 also corresponds to the pressure in the auxiliary piston circuit. If the pressure sensor signal of the pressure transducer DG in brake circuit BK1 only reduces very slowly following this displacement of volume from brake circuit BK1 into the auxiliary piston circuit, then the auxiliary piston circuit is leak-tight and intact. A very small reduction of the pressure sensor signal of the pressure transducer DG in brake circuit BK1 during test B as a result of the volume flow from the working chamber 8a of the auxiliary piston 10, through the hydraulic line HL3 and through the throttle of the throttle check valve arrangement 34 and via the hydraulic line HL14 and return line R into the reservoir 20, $\Delta p_{BL}$, must thereby be taken into account. This means that the seal 56 of the auxiliary piston, the solenoid valve WA and the check valve of the check valve/throttle arrangement 34 are leak-tight. The functions of the solenoid valves ESV and WA are also tested in this way. The pressure sensor signal of the pressure transducer DG at the end of the test is in this case $p_{t3}=p_{t2}-\Delta p_x-\Delta p_{BL}$. However, if the pressure sensor signal of the pressure transducer DG during test B fails more rapidly, as indicated by the broken-dotted curve, then at the end of test B at the time $t_3$ the pressure sensor signal of the pressure transducer DG is less by an amount equivalent to $\Delta p_{HiKo}$ than $p_{t2}-\Delta p_x-\Delta p_{BL}$ and a leak is present in the auxiliary piston circuit. Following the diagnostic cycle, the pressure regulation is resumed again and the pressure P is adjusted according to the driver's wishes.

Through an extension of test A, the solenoid valves MV/RV1, VF and $AV_{DHK}$ can also be tested for leak-tightness. The check valves RV2, S1 and S2 can also be tested for leak-tightness. The seals 60 and 61 of the double-acting piston (DHK) 6 can also be tested for leak-tightness.

This will now be briefly explained. After test A has shown that the brake circuits BK1 and BK2 are leak-tight, only the solenoid valve $AV_{DHK}$ is opened. If the pressure sensor signal of the pressure transducer DG does not decrease thereafter, then the solenoid valves MV/RV1 and VF and the check valve RV2 are leak-tight. If, after the leak-tightness of the solenoid valves MV/RV1 and VF and of the check valve RV2 has been confirmed, the actuation of the solenoid valves is released, so that both close, and only the solenoid valve VF is actuated, and if the pressure sensor signal of the pressure transducer DG does not then fall, then the solenoid valve $AV_{DHK}$, the check valve S2 and the seal 61 of the double-acting piston (DHK) 6 are also leak-tight. The seal 60 of the double-acting piston (DHK) 6 is in this case leak-tight, because otherwise the double-acting piston (DHK) 6 would be pushed back as a result of the pressure equalisation between the working chambers 4a and 4b via the first double-acting piston seal 60 due to the difference between the active piston surfaces A1 and (A1-A2), and volume would flow, via the first double-acting piston seal 60, out of the brake circuit BK1 into the working chamber 4a and, through this volume reduction, the pressure in the brake circuit BK1 would fall, and as a result the pressure sensor signal of the pressure transducer DG would also fall. The check valve S1 is in this case leak-tight, because otherwise the volume would flow from the working chamber 4a via the check valve S1 and via the return line R into the reservoir 20 and the pressure in working chamber 4a would be zero bar and the double-acting piston (DHK) 6 would be advanced through the pressure in the working chamber 4b and volume would flow via the hydraulic line HL7 and hydraulic line 24 from the brake circuit BK1 into the working chamber 4b. Due to this volume reduction in the brake circuit BK1 the pressure in the brake circuit BK1 would fall, and as a result the pressure sensor signal of the pressure transducer DG would also fall.

Thus, a complete leak-tightness testing of all valves and seals takes place during the diagnostic test CSD, with the exception of the check valve/throttle combination 32 and the auxiliary piston seal 56a. This can be additionally tested with the diagnostic test PSD.

FIG. 3 shows a diagnostic cycle, which can be carried out both during the braking action while the vehicle is stationary (CSD) as well as when parking the vehicle (PSD), for a system in which a leak flow channel 62 without a throttle 57 is provided between the two seals 56 and 56a of the auxiliary piston 10, and wherein the auxiliary piston 10 is designed without top-up bore. Alternatively, the auxiliary piston 10 only contains a single seal 56b.

The signals from the pedal travel sensor Master 12a, $s_M$, and from the pedal travel sensor Slave 12b, $s_{SL}$, are also shown in FIG. 3. The test A takes place as already described with reference to FIG. 2 for the diagnostic test CSD. For test C, in which the auxiliary piston circuit is tested for leak-tightness, the solenoid valve ESV remains closed. The solenoid valve WA is no longer actuated at the time $t_2$ and closes. The inlet valves of the wheel cylinders of the brake circuits BK1 and BK2 are now closed, and the solenoid valves VF and $AV_{DHK}$ are actuated and open, as a result of which a certain amount of volume flows from the brake circuit BK1 through the hydraulic lines HL7, HL4, HL12 and HL13 to the reservoir 20. The pressure P in the brake circuits BK1 and BK2 and the pressure sensor signal of the pressure transducer DG then fall to zero bar and consequently the counterforce exerted on the auxiliary piston rod 3 is also reduced. As a result, the auxiliary piston 10 advances slightly under the influence of the pedal force $F_p$ and after a very short time, at the time $t_3$, a pressure $p_{HiKo}(t_3)$ is generated in the working chamber 8a which depends on the pedal force $F_p$, and the pedal travel sensor signal Slave 12b assumes the value $s_{SL}(t_3)$. If the pedal force $F_p$ changes, the auxiliary piston 10 is only displaced to an insignificant extent, since the auxiliary piston circuit is hydraulically very stiff. If the pedal travel sensor signal Slave 12b $s_{SL}$ remains roughly constant, then the auxiliary piston circuit is leak-tight. The solenoid valves ESV, WA, the check valve 34 and the seals 55 and 56 and 56a or 56b are in this case leak-tight. Additionally, the correct opening function of the solenoid valves VF and $AV_{DHK}$ is confirmed. A very small increase of the pedal travel sensor signal Slave 12b during test C as a result of the volume flow from the working chamber 8a, via the hydraulic line HL3, through the throttle 57a of the throttle check valve arrangement 34 and the hydraulic line HL14 and via the return line R into the reservoir 20, $\Delta s_{BL}$, should thereby be taken into account. At the end of test C at the time $t_4$ the pedal travel sensor signal Slave 12b $s_{SL}(t_4)$ $=s_{SL}(t_3)+\Delta s_{BL}$. However, if the pedal travel sensor signal Slave 12b $s_{SL}$ increases more rapidly during test B, as indicated by the broken-dotted curve of the pedal travel sensor signal Slave 12b $s_{SL}$, then at the end of test B at the time $t_4$ the pedal travel sensor signal Slave 12b is greater by the amount $\Delta s_{HiKo}$ than $s_{SL}(t_3)+\Delta s_{BL}$ and there is a leak in the auxiliary piston circuit. Following the end of the diagnostic cycles at the time $t_4$, the solenoid valve $AV_{DHK}$ is closed and the inlet valves EV of the wheel cylinders in both brake circuits BK1 and BK2 are opened. As a result, the pressure in the brake circuits BK1 and BK2 increases again. Due to the opening of the solenoid valve ESV, volume flows from the brake circuit BK1 via the hydraulic line HL3 into the working chamber 8a of the auxiliary piston 10. Due to the opening of the solenoid valve WA, volume flows from the working chamber 8a via the hydraulic line HL15 and via the return line R into the reservoir 20, whereby the dynamic pressure at the solenoid valve WA causes the pressure in the working chamber 8a $p_{HiKo}$ at the time $t_5$ to rise to the value x, whereby the pressure P in the brake circuits BK1 and BK2 falls to the value x. At the time $t_6$ the pressure P in the brake circuits BK1 and BK2 and in the working chamber 8a of the auxiliary piston 10 and the pedal force $F_p$ has fallen away.

Figure 4:
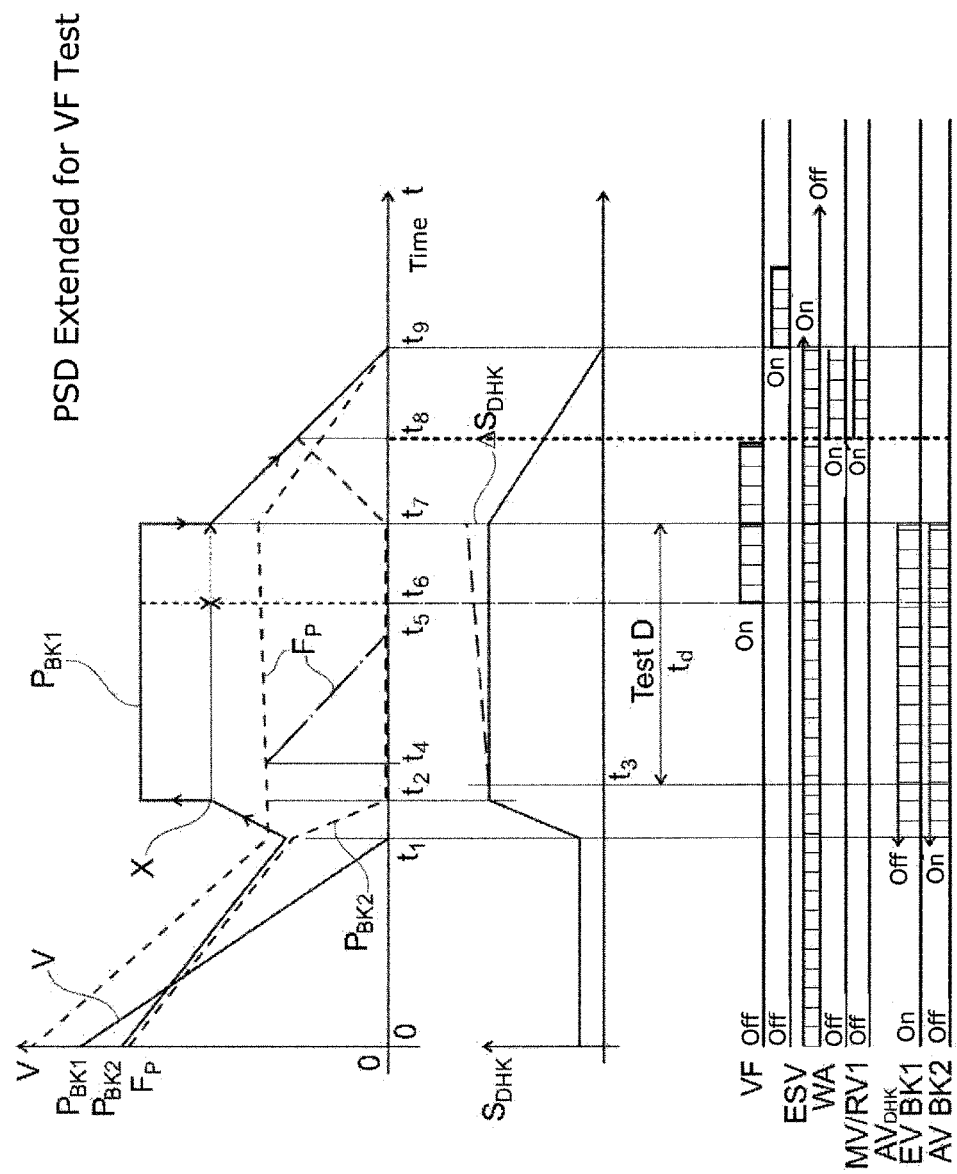
FIG. 4 shows a PSD braking manoeuvre with subsequent valve diagnosis in the higher pressure range.

FIG. 4 shows the diagnostic cycle PSD. After the vehicle has come to a standstill at the time $t_1$, the inlet valves of the wheel cylinders of brake circuit BK1 are closed and the outlet valves of the wheel cylinders of brake circuit BK2 are opened. Volume then flows from the wheel cylinders of brake circuit BK2 through the outlet valves and via the return line R into the reservoir 20 and the pressure in brake circuit BK2, $P_{BK2}$, then falls away. Volume then flows from the working chamber 2a of the piston-cylinder unit (main cylinder) 2, via the hydraulic line HL2, through the inlet valves of the wheel cylinders of brake circuit BK2, and through the outlet valves and via the return line R into the reservoir 20 and the pressure in the working chamber 2a of the piston-cylinder unit (main cylinder) 2 then falls away. Due to the pressure difference between the working chamber 2a and working chamber 2b, the floating piston SK is advanced until the floating piston SK reaches the limit stop of the piston-cylinder unit (main cylinder) 2 and the pressure in brake circuit BK2 reaches the value zero bar. As a result of a forward stroke of the double-acting piston 6, $s_{DHK}$, the braking pressure in brake circuit BK1, $P_{BK1}$, increases and at the time $t_2$ has reaches the value X. As from the time $t_2$, at which the floating piston SK reaches the limit stop of the piston-cylinder unit (main cylinder) 2, the pressure $P_{BK1}$ in brake circuit BK1 increases sharply with the forward stroke of the double-acting piston 6 due to the low elasticity of the brake circuit BK1 resulting from the closed inlet valves, and can be brought to high values without a large increase in the travel of the double-acting piston $s_{DHK}$. A short time after the floating piston SK has reached the limit stop of the piston-cylinder unit (main cylinder) 2, test D begins at the time $t_3$. If the pressure sensor signal of the pressure transducer DG in brake circuit BK1 remains constant with the double-acting piston 6 remaining immovable during the test duration $t_d$, then the brake circuit BK1 is leak-tight and the volume in the brake circuit BK1 is constant. The leak-tightness of the inlet valves of the wheel cylinders in brake circuit BK1, the second floating piston seal 59, the auxiliary piston rod seal 55, of the solenoid valve VF (because otherwise volume flows into the reservoir through the check valve RV2, via the hydraulic line HL6, via the inlet and outlet valves of the wheel cylinders in brake circuit 2 and via the return line R) and of the check valves S1 under a high pressure loading is thus con-firmed. It is thereby irrelevant whether the driver operates the brake pedal (dashed curve $F_p$) or not (broken-dotted curve $F_p$). If, following the end of the test duration $t_c$, a forward stroke of the double-acting piston $\Delta s_{DHK}$ was necessary in order to keep the pressure in brake circuit BK1 constant, then the brake circuit BK1 leaks under high pressure loading. Following the end of the test duration $t_d$, the outlet valves of the wheel cylinders in brake circuit BK2 are closed, the inlet valves of the wheel brake cylinders in brake circuit BK1 are opened, and the solenoid valve VF is opened. A pressure equalisation between brake circuit BK1 and brake circuit BK2 thereby takes place via the hydraulic lines HL7, HL4, via the open solenoid valve VF, via the hydraulic line 24, via the check valve RV2 and via the hydraulic line HL6, which is completed at the time $t_8$. At the time $t_8$, the solenoid valves MV/RV1 and $AV_{DHK}$ are opened and the solenoid valve VF is closed and as a result of the return stroke of the double-acting piston 6 volume flows from the brake circuit BK1 via the hydraulic lines HL7 and HL4 and via the solenoid valve MV/RV1 into the working chamber 4a of the double-acting piston (DHK) 6, as a result of which the pressure in brake circuit BK1 is reduced. Due to the connection of the brake circuit BK1 with the working chamber 2b of the piston-cylinder unit (main cylinder) 2 via the hydraulic line HL1, the pressure in working chamber 2b thus also falls. As a result of the pressure difference between the working chamber 2a and working chamber 2b, the floating piston SK is pushed back. As a result, volume flows from brake circuit BK2 to the working chamber 2b of the piston-cylinder unit (main cylinder) 2, as a result of which the pressure in brake circuit 2 also decreases. At the time $t_9$, the procedure is completed.

This diagnostic cycle PSD also detects small leakages in brake circuit BK1, which is important for the fallback condition in the event of failure of the brake circuit BK2. The test for leak-tightness of the brake circuits BK1 and BK2 at low pressures has already been described with reference to FIG. 2.

The function of the solenoid valve VF can be verified through the diagnosis PSD, with an alternative actuation of the solenoid valves VF, EV and AV. If, at the time $t_6$, the outlet valves of the wheel cylinders in brake circuit BK2 are closed, the inlet valves the wheel cylinders in brake circuit BK1 are opened and if the solenoid valve VF is opened (see dotted VF solenoid valve signal), then a pressure equalisation takes place between brake circuit BK1 and brake circuit BK2, as described above (dotted curves $P_{BK1}$ and $P_{BK2}$). This is manifested in a sudden downturn in the pressure sensor signal of the pressure transducer DG in brake circuit BK1.

In principle, the diagnostic cycle PSD proceeds in the same way, also in the case of the simplified valve switching as shown in FIG. 2 of DE 10 2014 111 594.5.

Figure 5:
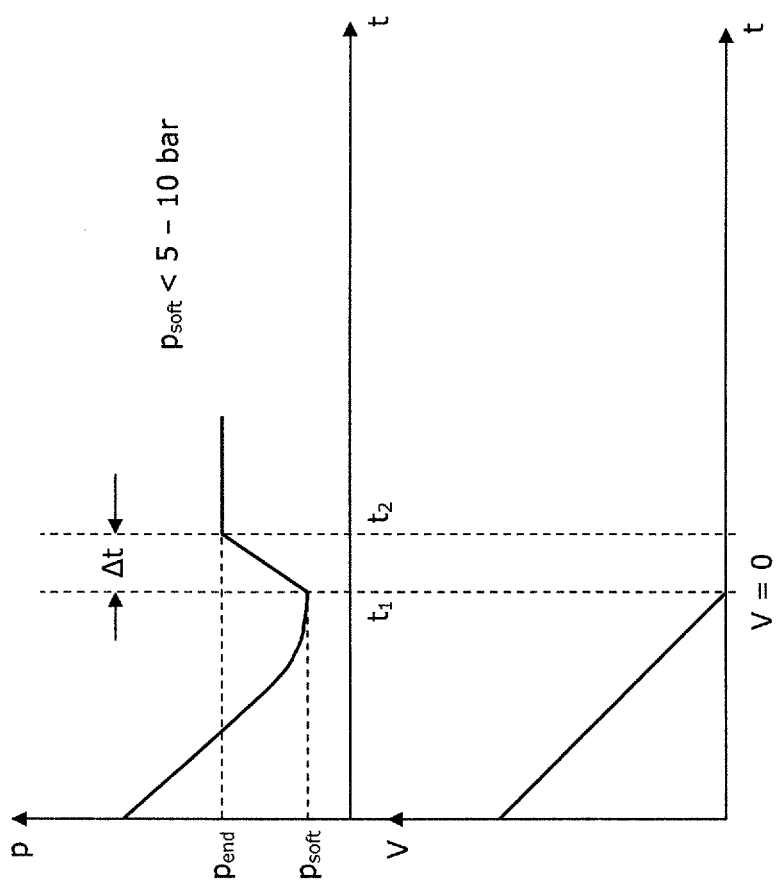
FIG. 5 shows a "soft stop" braking manoeuvre with subsequent pressure increase through full depression of the brake pedal.

FIG. 5 illustrates the frequently-observed braking behaviour involving a gentle braking action, which is also referred to as a "soft stop", in which, shortly before coming to a halt, the vehicle is braked with gentle deceleration until the vehicle comes to a standstill (v=0) at $t_1$. When the vehicle comes to a standstill at $t_1$, the braking pressure $p_{soft}$ is in most cases only 5 to 10 bar. Often, the driver then increases the braking pressure p by pressing the brake pedal 1 down fully. At $t_2$, the braking pressure has reached its final value $p_{end}$, which as a rule is not greater than 30 bar. In most cases no more than half a second elapses between $t_1$ and $t_2$. Since the braking pressure $p_{soft}$ in most cases only amounts to 5 to 10 bar and this pressure is too low for the diagnostic tests described above, according to the invention the start of the diagnostic tests is delayed until the pressure rises to $p_{end}$ or a certain time interval $\Delta t$ has elapsed.

LIST OF REFERENCE NUMBERS 1 actuation device or brake pedal
2 first pressure source or piston-cylinder unit
2a working chamber
2b working chamber
3 auxiliary piston rod
4 second pressure source or piston-cylinder unit
4a working chamber
4b working chamber
6 double-acting piston (DHK)
8 third pressure source or (auxiliary) piston-cylinder unit
8a working chamber
10 auxiliary piston
12a Master pedal travel sensor
12b Slave pedal travel sensor
14 motor
16 ball screw gear (DHK)
20 reservoir
24 hydraulic line
32 throttle check valve arrangement with throttle 57 c
34 throttle check valve arrangement with throttle 75a
55 rod seal
56 first seal
56a second seal
56b alternative auxiliary piston seal
57 throttle in leak flow channel 62 to reservoir
57a throttle in throttle check valve arrangement 34
57c throttle in throttle check valve arrangement 32
8 first floating piston seal
59 second floating piston seal
60 first double-acting piston seal
61 second double-acting piston seal
62 leak flow channel
63 top-up channel
A1 active piston surface (large)
A1-A2 active piston surface (small)
AV outlet valve (normally closed)
$AV_{DHK}$ solenoid valve (normally closed)

BK1 brake circuit 1
BK2 brake circuit 2
DG pressure transducer
ECU electronic control and regulation unit
ESV solenoid valve (normally open)
EV inlet valve (normally open)
HL1 hydraulic line
HL2 hydraulic line
HL3 hydraulic line
HL4 hydraulic line
HL6 hydraulic line
HL7 hydraulic line
HL8 hydraulic line
HL10 hydraulic line
HL12 hydraulic line
HL13 hydraulic line
HL14 hydraulic line
HL15 hydraulic line
KWS force-displacement sensor
MV/RV1 combined check/solenoid valve (normally closed)
R return line
RV2 check valve
S1 check valve
S2 check valve
SK floating piston
VBL valve block
VF solenoid valve (normally closed)
WA solenoid valve (normally closed)

What is claimed is:

1. A diagnostic method for determining the leak-tightness of at least one seal function, at least one valve function, or both, in a braking system with at least two brake circuits, wherein each brake circuit has a brake circuit hydraulic line to which, in each case, at least one wheel brake is connected, wherein the braking system has a regulatable pressure source which serves at least to effect a pressure build-up in the wheel brakes and at least one pressure sensor which determines the pressure in a brake circuit, wherein a control unit controls the valves and the regulatable pressure source, the method comprising:
    performing, by the control unit, at least one braking diagnostic procedure, the at least one braking diagnostic procedure comprising using one or more pressure measurements, using sensing of brake actuation device travel, or using both, wherein the at least one braking diagnostic procedure is performed following completion of a braking action:
        either at a pressure which is still present at the completion of the braking action in, or which is input into, the braking system, in one or both brake circuits and/or a hydraulic line or a working chamber of a piston-cylinder system, or at a lower pressure;
        or at a pressure of at most 30 bar, wherein the pressure is in, or input into, the braking system, in one or both brake circuits and/or a hydraulic line or a working chamber of the piston-cylinder system;
    wherein during the performing the at least one brake diagnostic procedure, the regulatable pressure source does not cause any change in pressure in one or both of the brake circuits.

2. The diagnostic method according to claim 1, wherein the performing the at least one braking diagnostic procedure is carried out after braking to a vehicle speed zero.

3. The diagnostic method according to claim 2, wherein the performing at least one braking diagnostic procedure comprises at least one diagnostic test, wherein the at least one diagnostic test is only started after an interval of 0.1 to 1 seconds after the vehicle speed reaches zero or after an increase in pressure after the vehicle speed reaches zero, caused by a person who is braking the vehicle.

4. The diagnostic method according to claim 2, wherein in the case of a "soft stop", a control unit regulates braking pressure in at least one of the at least two brake circuits such that the braking pressure does not fall below a minimum pressure until the vehicle speed reaches zero.

5. The diagnostic method according to claim 1, wherein the performing the at least one braking diagnostic procedure is carried out while the brake actuation device is still being actuated by a person braking the vehicle, wherein the method further includes monitoring, by the control unit, using a sensor, position and/or movement of the actuation device or of a part of the braking system which is coupled mechanically with the actuation device.

6. The diagnostic method according to claim 1, wherein the braking system additionally includes a connecting line which connects together the two brake circuit hydraulic lines of the brake circuits, and at least one switchable valve arranged in the connecting line for selective closure or opening of the connecting line, and wherein the braking system also includes a piston-cylinder arrangement with a working chamber which is limited by an auxiliary piston which is adjustable by means of the brake actuation device, wherein the at least one braking diagnostic procedure includes at least one first diagnostic test that comprises testing leak-tightness or function of
    at least one seal of a piston, as well as of a further seal of a piston-cylinder system of the braking system, and
    all outlet valves which are closed during the at least one first diagnostic test,
wherein the at least one first diagnostic test includes:
determining, using the at least one pressure sensor, a brake pressure, at least at a beginning and at an end of a time period corresponding to the at least one first diagnostic test, wherein the regulatable pressure source does not cause or bring about any change in pressure in the brake circuits between the beginning and the end of the at least one first diagnostic test, and
interpreting the occurrence of a brake pressure difference between the determined pressures greater than a predetermined maximum value indicates a leak or malfunction as long as the actuation device has maintained a substantially constant actuation force between the beginning and the end of the at least one first diagnostic test.

7. The diagnostic method according to claim 6, wherein the at least one first diagnostic test further includes, at the beginning of the at least one first diagnostic test, opening a hydraulic line connecting the working chamber with a reservoir, using a valve.

8. The diagnostic method according to claim 6, wherein the braking system additionally includes a connecting line which connects together the two brake circuit hydraulic lines of the brake circuits, and wherein at least one switchable valve is arranged in the connecting line for selective closure or opening of the connecting line, and wherein the braking system includes a piston-cylinder arrangement with a working chamber which is limited by an auxiliary piston which is adjustable by means of the brake actuation device, wherein the at least one brake diagnostic procedure further includes at least one second diagnostic test that comprises testing the leak-tightness or function of
    at least one seal of the piston-cylinder arrangement,
    and at least one closed valve which separates the working chamber from a hydraulic line in which a lower pressure is present than in the working chamber, wherein the at least one second diagnostic test includes:
determining, using the at least one pressure sensor, a pressure at least at a beginning and at an end of a period of time associated with the at least one second diagnostic test, wherein the regulatable pressure source does not cause or bring about any change in pressure in the brake circuits between the beginning and the end of the at least one second diagnostic test, and
interpreting a pressure difference between the determined pressures greater than a predetermined maximum value as indicating a leak or malfunction, as long as the actuation device has maintained a substantially constant actuation force between the beginning and the end of the at least one second diagnostic test.

9. The diagnostic method according to claim 8, wherein the performing the at least one braking diagnostic procedure comprises performing the at least one second diagnostic test immediately after the at least one first diagnostic test.

10. The diagnostic according to claim 8, wherein the at least one second diagnostic test includes, at the beginning of the at least one second diagnostic test, connecting the working chamber with one of the brake circuits by opening a valve, and closing using a valve, or leaving closed, a hydraulic line connecting the working chamber with a reservoir.

11. The diagnostic method according to claim 6, wherein the performing at least one braking diagnostic procedure further comprises:
performing one or more further diagnostic tests; and
performing the first diagnostic test at shorter intervals or more frequently than the one or more further diagnostic tests.

12. The diagnostic method according to claim 11, wherein at least one of the one or more further diagnostic tests is carried out at least once at a higher pressure than previous occurrences of the at least one of the one or more further diagnostic tests, wherein the at least one is at least the tenth occurrence.

13. The diagnostic method according to claim 11, further comprising performing at least one of the one or more further diagnostic tests at predetermined intervals at a higher pressure than a pressure used at intervening intervals, between the predetermined intervals, during which the at least one of the one or more further diagnostic tests is also performed.

14. The diagnostic method according to claim 6, wherein at least one first diagnostic test further includes closing a further valve that separates a brake circuit from a hydraulic line at a lower pressure than the brake circuit.

15. The diagnostic according to claim 1, wherein the performing the least one braking diagnostic procedure includes a third diagnostic test that includes testing the leak-tightness or function of
at least one seal of the piston-cylinder arrangement,
as well as valves sealing an auxiliary piston circuit,
wherein the third diagnostic test includes:
determining positions of a brake actuation device, using at least one travel sensor, at a beginning and at an end of a time interval associated with the third diagnostic test, wherein during the time interval associated with the third diagnostic test, the brake circuits are pressure-free, and
interpreting a difference between the positions determined in the determining exceeding a predetermined maximum value as indicating a leak or malfunction,
wherein at the beginning of or before the third diagnostic test, an auxiliary piston circuit is separated from the brake circuits by closing valves, and wherein pressure in the brake circuits is then reduced to zero by opening valves.

16. The diagnostic method according to claim 15, wherein a deviation in the different between the positions that occurs during the third diagnostic test due to an outflow of hydraulic medium via a throttle into a brake circuit or into a reservoir is used in determining the predetermined maximum value used to determine presence of a leak or malfunction.

17. The diagnostic method according to claim 15, wherein the performing at least one braking diagnostic procedure further comprises: following the third diagnostic test closing a solenoid valve as well as inlet valves and thereby increasing pressure in the brake circuits; and
at the same time or thereafter opening further solenoid valves and thereby decreasing the pressure in the brake circuits as well as in the working chamber.

18. The diagnostic method according to claim 1, wherein the braking system additionally includes a connecting line which connects together the two brake circuit hydraulic lines of the brake circuits, and at least one switchable valve arranged in the connecting line for selective closure or opening of the connecting line, and wherein the braking system includes a piston-cylinder arrangement with a working chamber which is limited by an auxiliary piston which is adjustable by means of a brake actuation device, wherein the performing at least one braking diagnostic procedure further comprises at least one fourth diagnostic test comprising testing leak-tightness or function of inlet valves of a brake circuit, of a floating piston seal, of an auxiliary piston rod seal, of a solenoid valve, and of a check valve,
wherein the at least one fourth diagnostic test comprises, after a vehicle incorporating the braking system has come to a standstill, first closing the inlet valves of the first brake circuit and opening outlet valves of one of the at least two brake circuits, causing pressure in the one of the at least two brake circuits and in a working chamber of a second piston-cylinder system coupled to the piston-cylinder unit to fall, which leads to a reduction in the size of the working chamber of the second piston-cylinder system, until the piston of the second piston-cylinder system reaches an end position; followed by adjusting a piston of the regulatable pressure source to increase pressure in a further brake circuit of the at least two brake circuits until a first time, and halting movement of the piston of the regulatable pressure source at the first time and monitoring pressure in the further brake circuit up until a second time, after the first time; and if the pressure in the further brake circuit does not remain constant during between the first time and the second time, or if a pressure difference measured in the further brake circuit exceeds a predetermined reference value, deciding that a leak or malfunction has occurred.

19. The diagnostic method according to claim 18, wherein the at least fourth diagnostic test further comprises monitoring a position of a double-acting piston, using the control unit; and interpreting movement of the double-acting piston as indicating a leak in the further brake circuit.

20. The diagnostic method according to claim 1, wherein the performing at least one braking diagnostic procedure includes performing at least two diagnostic tests designed to determine if a leak, malfunction or failure is present, wherein if a leak, malfunction or failure is determined by one or more preceding diagnostic tests of the at least two diagnostic tests, a subsequent diagnostic test is modified to be performed at a value of the pressure higher than a value of the pressure at which the subsequent diagnostic test would be performed if the leak, malfunction or failure had not been determined in the one or more preceding diagnostic tests.

21. The diagnostic method according to claim 1, wherein the braking system includes a normally-open 2/2-way solenoid valve configured for diagnosis and pressure reduction.

* * * * *